United States Patent [19]

Chapoton

[11] Patent Number: 5,063,529

[45] Date of Patent: Nov. 5, 1991

[54] METHOD FOR CALIBRATING A PHASED ARRAY ANTENNA

[75] Inventor: Charles W. Chapoton, Plano, Tex.

[73] Assignee: Texas Instruments Incorporated, Dallas, Tex.

[21] Appl. No.: 459,046

[22] Filed: Dec. 29, 1989

[51] Int. Cl.[5] ............................................ G01S 7/40

[52] U.S. Cl. ................................ 364/571.02; 342/174

[58] Field of Search ........ 342/173, 174, 165, 368-372; 364/571.01, 571.02, 571.05

[56] References Cited

U.S. PATENT DOCUMENTS

| | | | |
|---|---|---|---|
| 4,488,155 | 12/1984 | Wu | 342/174 |
| 4,520,361 | 5/1985 | Frgzitg | 342/174 |
| 4,864,315 | 9/1989 | Mohuohy | 342/173 |
| 4,926,186 | 5/1990 | Kelley et al. | 342/173 |

*Primary Examiner*—Salvatore Cangialosi

*Attorney, Agent, or Firm*—Rene' E. Grossman; Melvin Sharp

[57] ABSTRACT

A calibration method for a phased array antenna uses automated signal processing techniques to compute calibration coefficients, and can be performed while the antenna is on-line. The calibration method is based on a generalized model in which the array is characterized by a phase-state control function. The calibration coefficients for a phase shift element are computed using phase response measurements derived from an estimation of the residual aperture response attributable to the other elements. For each element of the array, a first set of I Q aperture response measurements is used to estimate (FIG. 1*a*, 10) the $R_I$ and $R_Q$ residual components of the total I Q aperture response attributable to the other elements. Using these residual components, a second set Y of I Q aperture response measurements is converted (FIG. 1*b*, 20) to measurements of the phase response attributable to the selected element. From these phase response measurements, the calibration coefficients $\phi_i$ can be computed (FIG. 1*c*, 30) using the phase-state control function.

27 Claims, 7 Drawing Sheets

METHOD FOR CALIBRATING A PHASED ARRAY ANTENNA

TECHNICAL FIELD OF THE INVENTION

This invention relates in general to phased array antennas, and more particularly to a method for calibrating a phased array antenna.

BACKGROUND OF THE INVENTION

Phase steered arrays include a large number of phase-shift elements. The phase and amplitude of each element may be controlled to generate a beam with a particular shape in a particular direction. Typically, the relative amplitudes of each element are fixed, while phase shift settings are adjusted to shape and steer (or point) the beam.

One common phased array implementation uses phase-shift element consisting of a selected number of cascaded binary phase shift components that provide incremental phase shifts. Each phase shift element is set to a selected phase state by a binary control word in which each bit controls a corresponding binary phase shift component, or phase bit, such that the phase response for the element is the sum of the selected phase increments.

To precisely control the beam, the actual phase response of each element must be known precisely. However, phase response is subject to unavoidable errors due to manufacturing discrepancies, and to non-linear materials properties as a function of temperature. Thus, calibration is generally required to provide calibration coefficients for each phase shift element, which can be stored and used during phase steering operations to correct phase response errors.

For some phased array systems the calibration problem is relatively straightforward because the input to each phase shift element may be individually controlled, and its output seperately measure. However, for many systems, space, cost and/or complexity constraints do not allow access to each element, but rather, only the aggregate aperture response (in-phase I and quadrature Q) of all elements in the antenna aperture is available. For these systems, calibrating the phased array can be a relatively involved process, particularly if regular recalibration is required.

Some types of phase shift elements are well behaved in that phase response does not vary significantly over time or as a result of changes in temperature (or other environmental factors). However, the performance of these elements in isolation may differ when they are included in array, requiring calibration to be performed (less conveniently) on an assembled array.

Other types of phase shift elements vary relatively unpredictably over time and/or temperature. For this type of phased array, calibration measurements must be made, and the resultant calibration coefficients estimated, at intervals less than the interval over which the calibration coefficients change significantly.

In either case, current calibration techniques involve empirically estimating calibration coefficients. This approach is disadvantageous in that calibration measurements must be made with special test equipment while the array is off-line. Another significant disadvantage of this empirical approach is that it does not use automated signal processing techniques.

These disadvantages are particularly problematic for arrays in which phase-shifter performance changes with temperature. For such systems, in an effort to extend recalibration intervals, significant design effort is often expended to provide at least some immunity to changes in operational temperatures (for example, by using refrigeration).

Accordingly, a need exists for an improved method of calibrating a phase steered array, which is based on a generalized model of a phased array, and is capable of dynamically updating calibration coefficients while the array is on-line. Preferably, the method would use automated signal processing techniques capable of implementation in equipment generally available in the system of which the array is a component.

SUMMARY OF THE INVENTION

The present invention is a calibration method for a phased array antenna system, which uses automated signal processing techniques to compute calibration coefficients based on a generalized model of the array. The calibration coefficients for a phase shift element are computed using phase response measurements derived from an estimation of the residual aperture response attributable to the other elements.

In one aspect of the invention, the method of calibrating a phased array uses a generalized model of an array of N phase shift elements in which each element is characterized by a predetermined number of calibration coefficients, and by a phase-state control function, $$\Phi_J = f(\phi_{i=1,M}, c)$$

that describes the phase response $\Phi_J$ of the element as a function of both the calibration coefficients $\phi_{i=1,M}$ and a control word c which selects a particular phase state of the aperture response.

For each element, calibration coefficients are determined by (a) estimating the residual components of the aperture response attributable to the other elements, (b) measuring the phase response of the selected element using the residual components, and (c) computing the calibration coefficients for the selected element from the phase response measurements using the phase-state control function.

The calibration method uses calibration signals input to the array to generate in-phase I and quadrature Q aperture responses. For a given phase shift element J, the measured I Q aperture responses can be represented by the equations:

$$I = S\cos\Phi + R_I$$

$$Q = S\sin\Phi + R_Q$$

where S is the output signal amplitude of that element, $\Phi$ is the phase response attributable to that element (which is a function of the calibration coefficients $\Phi_{i=1,M}$ and the control word c), and $R_I$ and $R_Q$ are the residual components of the total aperture response attributable to the other elements.

A first set of I Q aperture response measurements is used to estimate the $R_I$ and $R_Q$ residual components of the aperture response. Using these residual components, a second set of I Q aperture response measurements is converted to phase response measurements $\Phi_J$ attributable to the selected element. From these phase response measurements, the calibration coefficients $\phi_i$ can be computed using the phase-state control function.

The procedure for estimating the $R_I R_Q$ residual components, which do not vary as the phase-state control function $f(\phi_{i=1,M},c)$ for the selected element is changed, involves (a) selecting a set X of control words for the selected element, (b) measuring the resultant $I_x$ and $Q_x$ aperture responses, and (c) estimating the residual response components, along with the signal output amplitude S, in accordance with the identity $$(I_x-R_I)^2+(Q_x-R_Q)^2=S^2$$

preferably by solving for $R_I/R_Q$ and S in terms of the measured $I_x$ $Q_x$ aperture responses.

The procedure for measuring the phase response $\Phi_J$ for the element J involves (a) selecting a set Y of control words for that element, (b) measuring the resultant $I_y$ and $Q_y$ aperture responses, and (c) converting those measurements to the phase responses attributable to the selected element according to the inverse functions:

$$\Phi_J=\cos^{-1}((I_y-R_I)/S)$$

$$\Phi_J=\sin^{-1}((Q_y-R_Q)/S)$$

Either of these inverse functions may be used, with the choice depending upon which channel, I or Q, allows more accurate estimation.

Once the phase responses for the selected element have been estimated, the associated calibration coefficients can be computed using the phase-state control function. The calibration coefficients are computed relative to a phase reference, with the reference calibration coefficient associated with a reference incremental phase shift being given by $\Phi_o=M_o-\Theta_S-\Theta'J$, where $M_o$ is a phase response measurement derived from a reference control word using the inverse functions, $\Theta_S$ is the unknown phase of the driving signal, and $\Theta'_J$ is the phase deviation for element J relative to the reference.

In more specific aspects of the invention, the phased array calibration method is described in connection with calibrating an exemplary array of N M-bit phase shift elements, with each element consisting of M binary phase-shift components (phase bits) providing $2^M$ phase states. For this exemplary array, the binary control word of the phase-state control function includes a control bit for each phase bit, such that the control word designates the discrete phase increments that together determine a selected phase state.

This exemplary N element M-bit phased array can be characterized by the phase-state control function:

$$\Phi_J=\Sigma_{i=1,M}(\delta_{iJ}\phi_{iJ})+\Theta_J$$

where $\delta_{iJ}$ are the binary control bits of the control word, $\phi_{iJ}$ are the calibration coefficients associated with each phase shift element (one for each phase bit), and $\Theta_J$ is the phase of the injected signal at element J.

The residual components $R_I$ and $R_Q$ are estimated by selecting three different control words (i.e., three different phase-state settings) for the element J, and then estimating $R_I$ and $R_Q$ using the expressions:

$$R_I = \{[(I_1^2 - I_2^2) + (Q_1^2 - Q_2^2)](Q_2 - Q_3) - [(I_2^2 - I_3^2) + (Q_2^2 - Q_3^2)](Q_1 - Q_2)\}/ 2\{(I_1 - I_2)(Q_2 - Q_3) - (I_2 - I_3)(Q_1 - Q_2)\}$$

and $$R_Q = \{[(I_1^2 - I_2^2) + (Q_1^2 - Q_2^2)](I_2 - I_3) - [(I_2^2 - I_3^2) + (Q_2^2 - Q_3^2)](I_1 - I_2)\}/ 2\{(I_1 - I_2)(Q_2 - Q_3) - (I_2 - I_3)(Q_1 - Q_2)\}.$$

The only requirement for the phase-state settings is that the denominators of the above expressions are not near zero, so that the calculations are well behaved.

Preferably, the calibration signal inputs used to generate the I and Q aperture responses are injected, to allow calibration to be accomplished dynamically while the phased array is on-line (although the calibration method is adaptable to use with radiated input signals). To inject the calibration signals, a signal injection structure for each phase shift element would be incorporated into the phased array structure.

The technical advantages of the invention include the following. The phased array calibration method of the invention can be used to dynamically update the calibration coefficients that correct phase-shift errors for each phase shift element of the array. The calibration method is based on a generalized model of a phased array, permitting the calibration procedures to be defined in terms of the model, and implemented using conventional automated signal processing techniques. Real-time processing primarily uses vector operations, which are suitable for execution in a vector oriented signal processor such as typically used by phased array systems. The calibration method does not require precise control of the phase or amplitude of the input calibration signal, and may be optimized for a set of expected errors and availabel computational resources. Using injected calibration signals permits the calibration method to be performed while the antenna array is on-line, facilitating dynamic update of the calibration coefficients. By providing automated procedures for dynamically updating the calibration coefficients, the calibration method reduces the temperature-control requirements otherwise necessary to increase intervals between recalibration procedures.

BRIEF DESCRIPTION OF THE DRAWINGS

For a more complete understanding of the present invention, and for further features and advantages, reference is now made to the following Detailed Description, taken in conjunction with the accompanying Drawings, in which.

DETAILED DESCRIPTION OF THE INVENTION

Figure 1A:
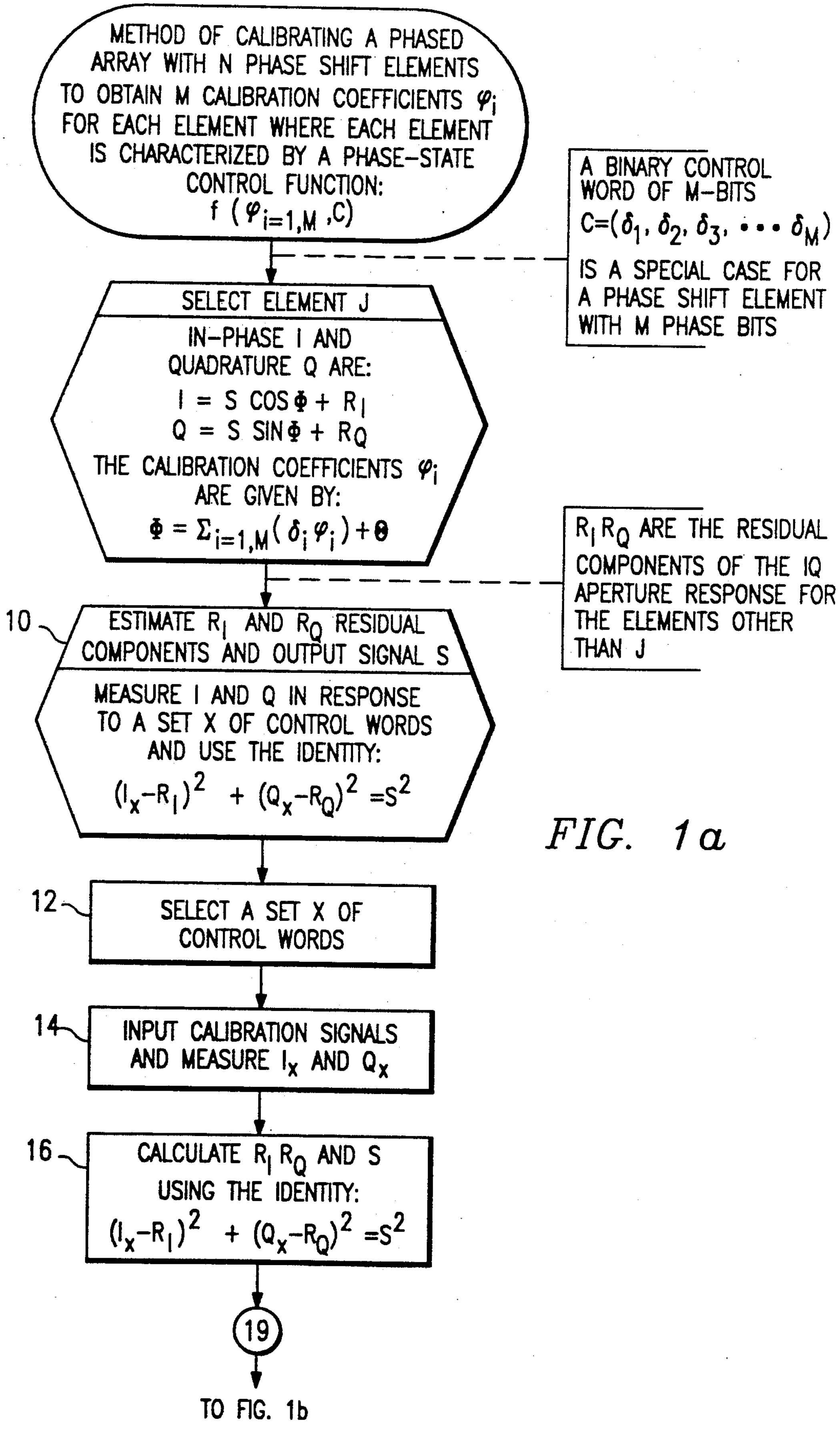
FIGS. 1A, 1B and 1C illustrate the general phased array calibration method according to the invention.

The Detailed Description of an exemplary embodiment of the phased array calibration method of the invention is organized as follows:

1. General Calibration Method
2. Exemplary N element M-bit Array
3. Estimating Residuals $R_I$ and $R_Q$
   3.1. Residual Estimation
   3.2. Minimizing Residuals
4. Measuring Phase Response
   4.1. Orthogonalization and Rotation
   4.2. Phase Response Measurements
5. Computing Calibration Coefficients
   5.1. Reference Phase Estimation
   5.2. Least Squares Processing
   5.3. Array Amplitude Weighting
6. Radiated Signal Input
7. Conclusion The calibration method is described in relation to an exemplary application for computing calibration coefficients for an N element array of M-bit phase shifters. Each phase shift element has M binary phase-shift components (phase bits). A single calibration coefficient is associated with each of the M phase-shift components.

While the Detailed Description is in relation to this exemplary application, the invention has general applicability to computing calibration coefficients for a phased array that can be described by a model in which each phase shift element of the array is characterized by M calibration coefficients, and the phase response for that element can be characterized in terms of those calibration coefficients using the phase-state control function $f(\phi_{i-1,M},c)$.

1. General Calibration Method. The calibration method of the invention can be used to dynamically compute the calibration coefficients for a phased array antenna system while the system is on-line.

The calibration coefficients for a phase shift element are computed using phase response measurements derived from an estimation of the residual aperture response attributable to the other elements. These calibration coefficients can then be used to correct phase-response errors during normal phase steering operations.

The method of calibrating a phased array is based on a generalized model of an array of N phase shift elements in which a selected element J is characterized by a predetermined number of calibration coefficients M, and the phase response $\Phi_J$ of that element can be characterized in terms of the those calibration coefficients (and the phase increments they represent) using the phase-state control function:

$$\Phi_J=f(\phi_{i=1,M},\ c)$$

The phase-state control function $f(\phi_{i=1,M},c)$ describes the phase states of a phase shift element J as a function of both the calibration coefficients $\phi_i$, and a control word c that selects a particular phase-state.

The calibration method uses calibration signals input to the array to generate in-phase I and quadrature Q aperture responses, which are measured and used for computing the calibration coefficients. For a given phase shift element J, the measured I Q aperture responses are represented by the defining equations:

$$I=S\cos\Phi+R_I$$

$$Q=S\sin\Phi+R_Q$$

where S is the output signal amplitude of that element, $\Phi$ is the phase shift response attributable to that element (which is a function of the calibration coefficients $\phi_{i=1,M}$ and the control word c), and $R_I$ and $R_Q$ are the residual components of the aperture response attributable to the other elements.

Figure 1B:
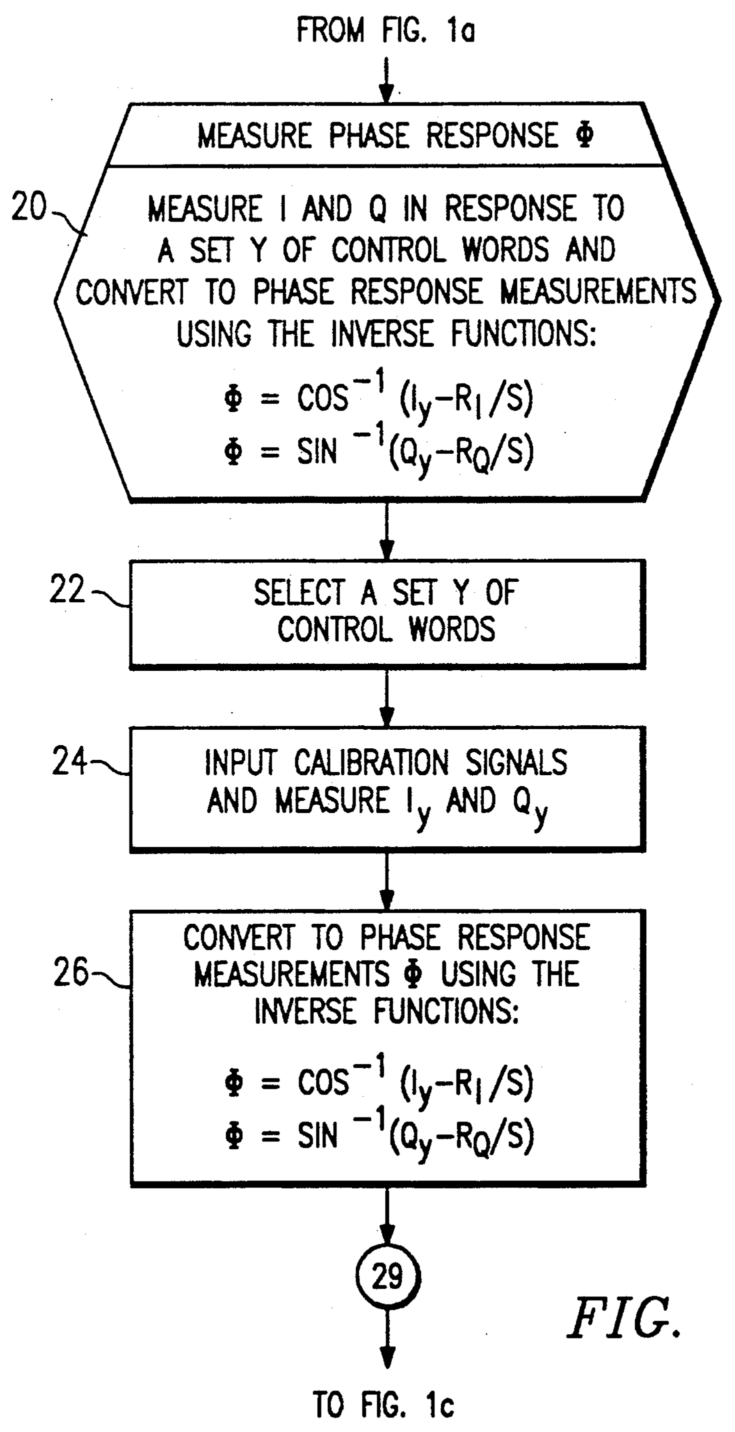
Figure 1C:
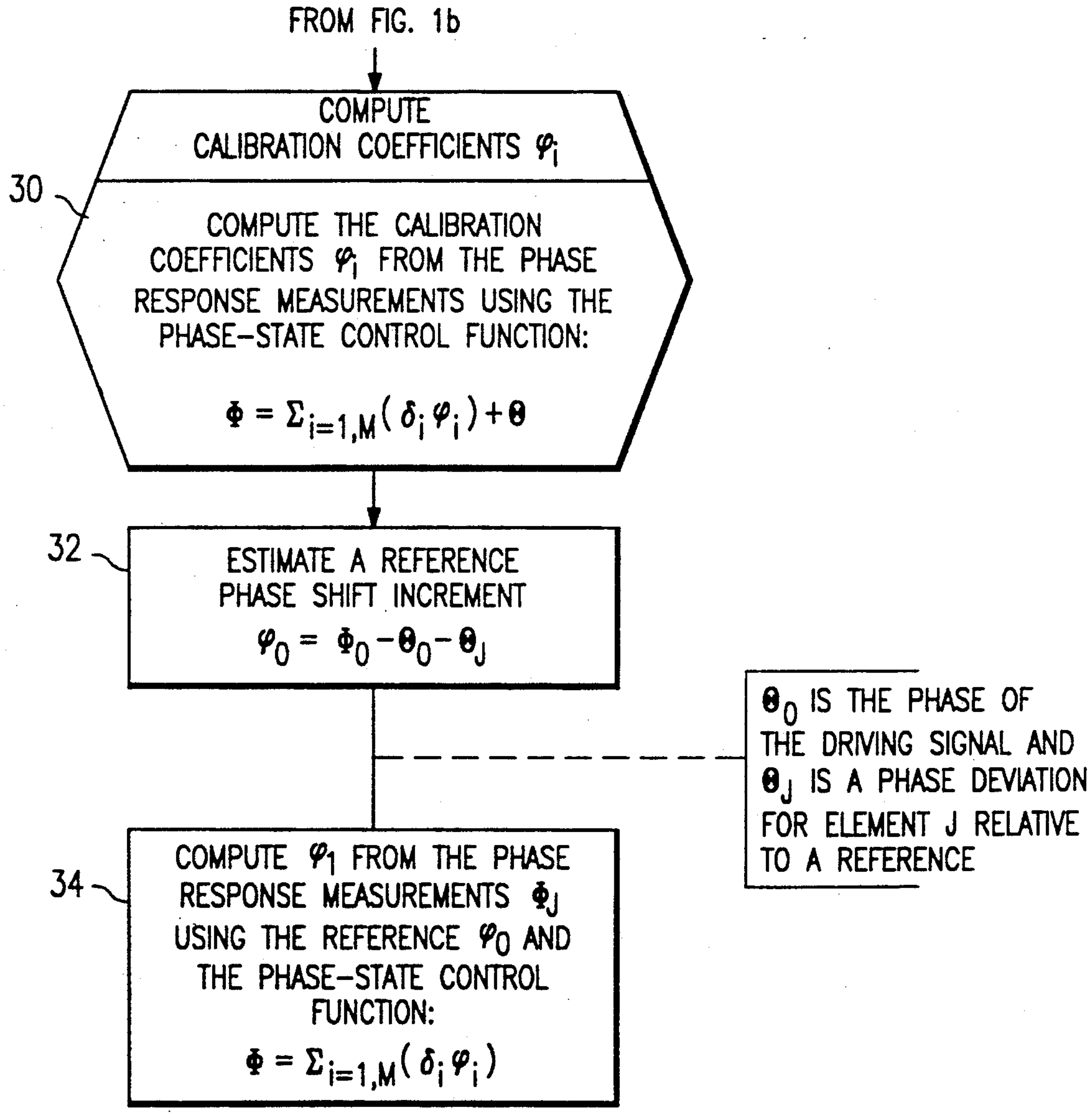

FIGS. 1*a*, 1*b* and 1*c* diagram the general calibration method of the invention. A first set X of I Q aperture response measurements is used to estimate (FIG. 1*a*, 10) the $R_I$ and $R_Q$ residual components of the total I aperture response. Using these residual components, a second set Y of I Q aperture response measurements is converted (FIG. 1*b*, 20) to corresponding measurements of the phase response $\Phi_J$ attributable to the selected element. From these phase response measurements, the calibration coefficients $\phi_i$ can be computed (FIG. 1*c*, 30) using the phase-state control function.

The procedure for estimating (FIG. 1*a*, 10) the $R_I R_Q$ residual components, which do not vary as the phase-state control function $f(\phi_{i=1,M},c)$ for the element J is changed, involves (a) selecting (12) a set X of control words for that element, (b) measuring (14) the resultant $I_x$ and $Q_x$ aperture responses, and (c) estimating (16) the residual response components, along with the output signal amplitude S, in accordance with the identity $$(I_x-R_I)^2+(Q_x-R_Q)^2=S^2$$

preferably by solving for $R_I$ $R_Q$ and S in terms of the measured $I_x$ and $Q_x$ aperture responses.

The procedure for measuring (FIG. 1*b*, 20) the phase response $\Phi_J$ for the selected element involves first (a) selecting (22) a set Y of control words for that element, (b) measuring (24) the resultant $I_y$ and $Q_y$ aperture responses, and (c) converting (26) those measurements to the corresponding phase responses attributable to the selected element according to the inverse functions:

$$\Phi_J=\cos^{-1}((I_y-R_I)/S)$$

$$\Phi_J=\sin^{-1}((Q_y-R_Q)/S)$$

Either of these inverse functions may be used, with the choice depending upon which channel, I or Q, allows more accurate estimation.

Once the phase response measurements have been estimated, the calibration coefficients can be computed (30) from the phase-state control function $\Phi_J=f(\phi_{i=1,M},c)$. The calibration coefficients are computed relative to a phase reference, with the reference calibration coefficient associated with a reference incremental phase shift being given by:

$$\phi_o=M_o-\Theta_S-\Theta'_J$$

where $M_o$ is a phase response measurement derived from a reference control word using the inverse functions, $\Theta_S$ is the unknown phase of the driving signal, and $\Theta'_J$ is the phase deviation for element J relative to the reference.

Thus, the reference calibration coefficient $\phi_o$ can be estimated (32) within a constant bias $\Theta_S$, which is of no consequence because phase steering depends upon the relative phases of the elements (see, Section 5.1). With the reference calibration coefficients $\phi_o$ known for each phase shift element of the array, the other calibration coefficients $\phi_i$ may be computed (34) from the control word settings Y and the resulting phase response measurements using the phase-state control function.

The preferred technique for inputting the known calibration signals is to provide a calibration signal injection structure (such as appropriate RF waveguides with directional couplers for each phase shift element) as part of the phased array structure. Using injected signals, rather than radiated signals detected by the antenna aperture, allows the calibration method of the invention to be performed in real time while the array is on-line, permitting the phase-shift calibration coefficients to be dynamically updated. The principal limitation on the frequency of this dynamic update operation will be the signal processing power available in the antenna system of which the array is a part.

An alternative to incorporating a separate calibration signal injection structure, and/or to the real time update of the phase-shift calibration coefficients, is to use a radiated calibration signal detected by the antenna aperture. This off-line alternative is described in Section 6.

The phase-shift coefficient calibration method of the invention is adaptable to automated implementation using conventional signal processing techniques. In the case of an implementation using injected calibration signals, the phase-shift calibration coefficients may be computed in real time. The real-time processing primarily involves vector operations suitable for execution in a vector oriented signal processor such as typically used by phased array antenna systems.

Depending upon processing power available in the antenna system, calibration procedures may be completed for some or all of the phase-shift elements during any given calibration cycle. Whatever update interval is chosen, the calibration method of the invention can be used to dynamically update the calibration coefficients for a phased array antenna system while the system is on-line, maintaining accuracy despite deviations in phase-shifter performance such as caused by changes in temperature.

2. Exemplary N-Element M-Bit Array. The Detailed Description of the calibration method of the invention is in relation to dynamically computing the calibration coefficients for an exemplary N-element M-bit phased antenna array.

Each phase shift element of the array comprises M binary phase-shift components (phase bits), providing a total of $2^M$ phase states (phase shift increments). A single calibration coefficient is associated with each of the M phase-shift components. For this exemplary calibration application, the control word c of the phase-state control function $f(\phi_i,c)$ includes a control bit $\delta_i$ for each of the M phase bits. A specific phase state setting for a phase shift element is obtained by selecting a control word that correspondingly sets the phase bits of the element to obtain the specific phase shift increments that determine the phase state.

Figure 2A:
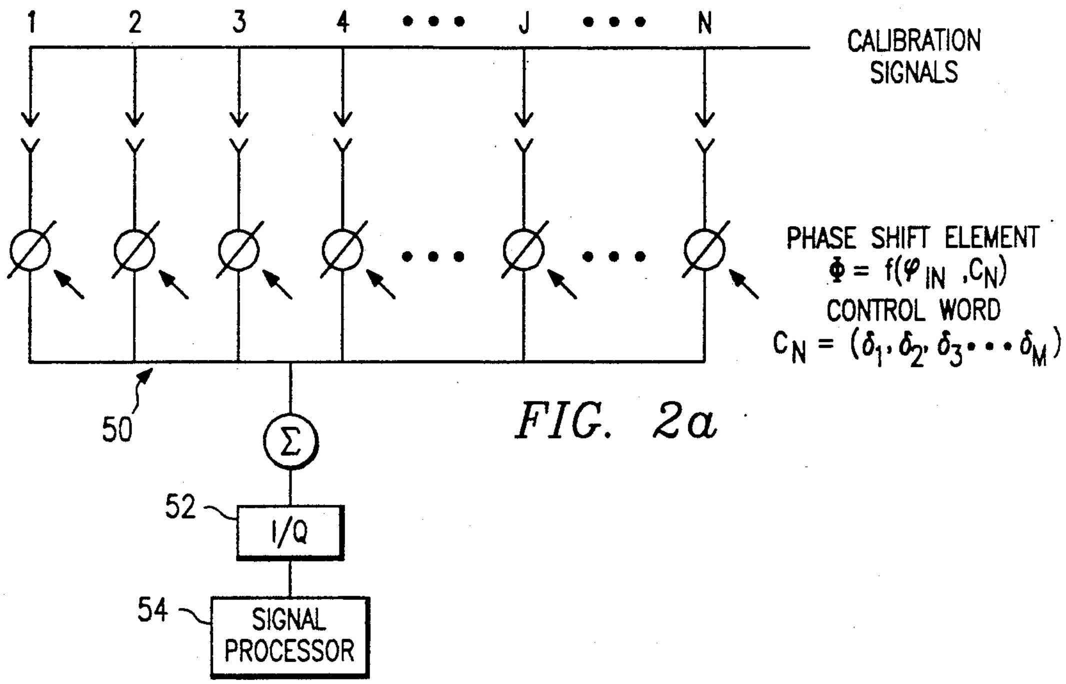
FIGS. 2*a* and 2*b* respectively illustrate an exemplary phased array and an exemplary 4-bit phase shift element of that array.
Figure 2B:
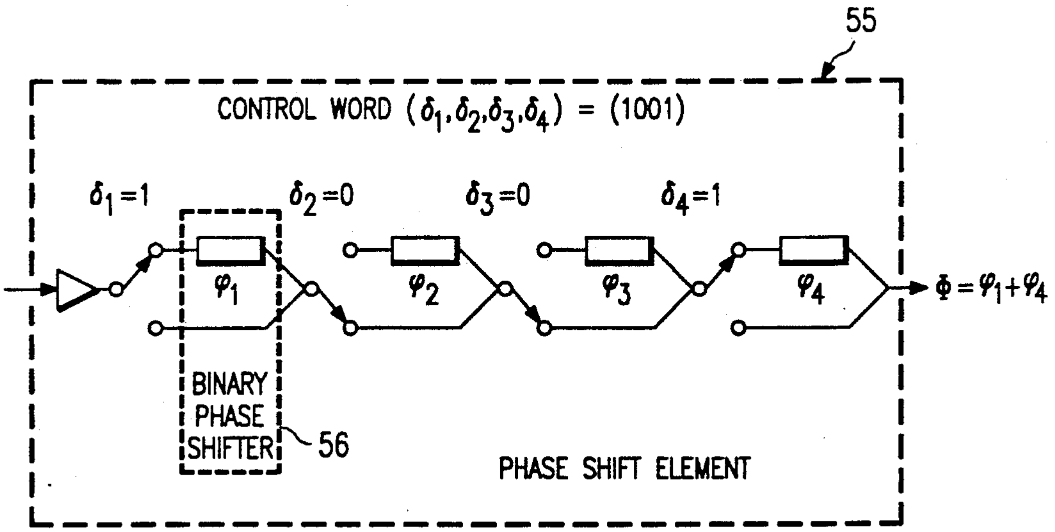

FIGS. 2a and 2b illustrate the exemplary phased array configuration using binary phase shifters. An array 50 of N phase shift elements includes an element J. In response to calibration signals S, being input to the aperture, each phase shift element J outputs a phase response $\Phi_J$ that depends upon the control word setting for that element. The phase responses are summed, and input to an I/Q network 52 that generates corresponding in-phase I and quadrature Q aperture responses. The I and Q aperture responses are input to the signal processor 54 (which may be the signal processor for the antenna system) for processing in accordance with the calibration method of the invention.

Referring to FIG. 2b, an exemplary 4-bit phase shift element 55 includes four binary phase-shift components 56. Each binary phase-shift component (phase bit) is characterized by an associated calibration coefficient $\phi_i$. Each phase bit is controlled by a respective control bit $\delta_i$ of the control word, which determines whether the associated incremental phase shift is introduced. The resultant phase response $\Phi_J$ of the phase shift element 55 is the sum of the selected phase increments.

Selecting the number of phase-shift elements N, and the number of phase states for each element (two phase states per phase bit), is determined by overall antenna performance specifications. For example, a conventional phased array antenna system might use one hundred elements, each comprising a 4-bit phase shifter with 16 phase states in phase increments of 22.5 degrees (i.e., 0°, 22.5°, 45°, 67.5°, 90°, etc.), implemented using binary phase-shift components with phase shift increments of 22.5°, 45°, 90° and 180°.

In terms of the phased array model of the invention, the phase response for the exemplary N-element M-bit phased array can be characterized by the phase-state control function:

$$\Phi_j=\Sigma_{i:1,M}(\delta_{iJ}\phi_{iJ})+\Theta_J$$

where, for each phase shift element J, $\delta_{iJ}$ are the M control bits associated with respective phase bits, $\phi_{iJ}$ are the corresponding M calibration coefficients for those binary phase-shift components, and $\Theta_j$ is the phase of the injected signal.

For any element J, the in-phase I and quadrature Q responses to an injected signal $S'_J$ (relative to a phase reference) are:

$$I_J=S_J\cos(\Sigma_{i:1,M}(\delta_{iJ}\phi_{iJ})+\Theta_J)$$

and $$Q_J=S_J\sin(\Sigma_{i:1,M}(\delta_{iJ}\phi_{iJ})+\Theta_J)$$

where:

$S_J$=the signal output amplitude for the phase shift element, which corresponds to $S'_J$ less the losses in the element and amplitude taper in the array;

$\delta_{iJ}$=the M control bits that control the phase bits, such that a control word ($\delta_1$, $\delta_2$, $\delta_3$, . . . $\delta_M$) designates a specific phase state of the J element;

$\phi_{iJ}$=the M calibration coefficients, each corresponding to the incremental phase shift that results when the associated phase bit is selected in response to a control word; and $\Theta_J$=the phase of the injected signal at the selected element J.

Thus, the total I and Q aperture response (i.e., the output of the parralleled N phase shift elements) is given by:

$$I=\Sigma_{j:1,N}S_j\cos(\Sigma_{i:1,M}(\delta_{ij}\phi_{ij})+\Theta_j)$$

$$Q=\Sigma_{j:1,N}S_j\sin(\Sigma_{i:1,M}(\delta_{ij}\phi_{ij})+\Theta_j)$$

The values of calibration coefficients $\phi_{ij}$ are assumed to be temperature dependent, and different from the nominal values as the aperture heats up.

3. Estimating Residuals $R_I$ and $R_Q$. For any element J, the total aperture response to an input signal can be vectorially divided into two components—a component attributable to the phase response of the element J, and a component attributable to the response of the rest of the aperture (the residual aperture response). The calibration method of the invention uses measured in-phase I and quadrature Q aperture response values to estimate the residual aperture response components, which can then be used to estimate the phase response of the selected element.

For any element J, the total I and Q aperture response can be written in terms of the vectoral components for that element:

$$I = S_j \cos(\Phi_J) + \Sigma_{j:1,N;j \neq J} S_j \cos(\Phi_j)$$

$$Q = S_J \sin(\Phi_J) + \Sigma_{j:1,N;j \neq J} S_j \sin(\Phi_j)$$

where $$\Phi_j = \Sigma_{i:1,M}(\delta_{iJ}\phi_{iJ}) + \Theta_J$$

For convenience in the following discussion, the J subscript on $S_J$, $\delta_{iJ}$, $\Phi_J$, $\Theta_J$ is dropped.

The residual components $R_I$ and $R_Q$ for the selected element can be designated $$R_I = \Sigma_{j:1,N;j \neq J} S_j \cos \Phi_j$$

and $$R_Q = \Sigma_{j:1,N;j \neq J} S_j \sin \Phi_j$$

Using these expressions for $R_I$ and $R_Q$, the expressions for the total I and Q aperture response simplify to the following defining equations:

$$I = S \cos \Phi + R_I$$

$$Q = S \sin \Phi + R_Q$$

given in terms of the vectoral components of the aperture response.

Solving the defining equations for the residuals $R_I$ and $R_Q$ in terms of measurable I and Q values allows the residuals to be estimated by (a) varying the arguments of the sine and cosine functions (i.e., varying the control bits $\delta_i$), and (b) measuring the resultant I Q aperture responses. Note that the $R_I$ $R_Q$ residuals do not vary when the control bits $\delta_i$ associated with element J change (corresponding to a change in phase state for that element), since they contain no component from element J. Note also that $2^M$ possible values of $\Sigma_{i:1,M}\delta_i\phi_i$ are available, since each control bit $\delta_i$ has two possible values.

Figure 3:
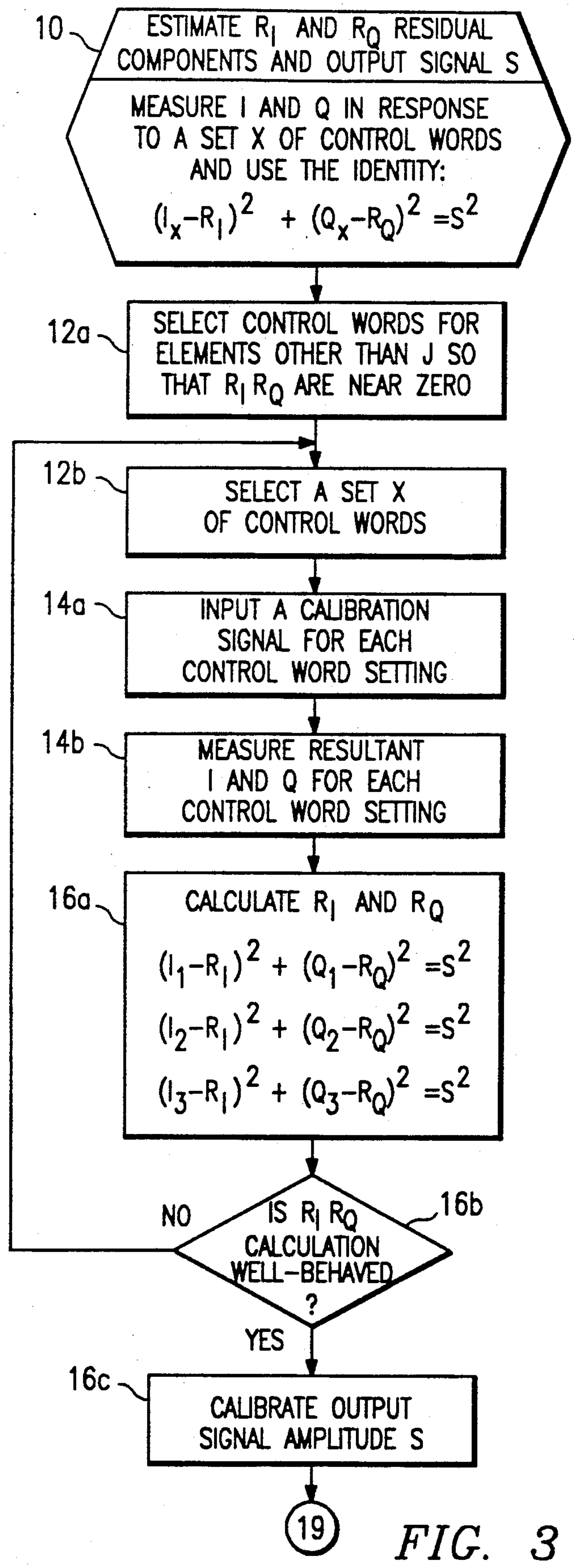
FIG. 3 diagrams a procedure for estimating the residuals $R_I$ and $R_Q$.

3.1. Residual Estimation. FIG. 3 diagrams the recommended procedure for estimating the residual components $R_I$ and $R_Q$ of the total aperture response.

The first step is to set up the array so that the residual components will be near zero, which is done by appropriately selecting (12a) the control words ($\delta_{ij;j \| J}$) for the phase shift elements other than the selected element J (see, Section 3.2). With the residual components near zero, the major contributor to the I Q aperture response measurements will be the phase responses of the selected element J, which are used to compute the calibration coefficients.

The residual components can then be estimated by selecting (12b) a set X of three different control words for the selected element J, corresponding to three different phase states. For each control word setting, calibration signals are injected (14a), and the resultant I Q aperture response measured (14c).

For the set X of control words, the defining equations can be written:

$$I_x = S \cos \Phi_x + R_I$$

$$Q_x = S \sin \Phi_x + R_Q$$

where x specifies the control word selected. Note that the values of the corresponding phase responses $\Phi_x$ for the element J are unknown, since the associated calibration coefficients $\phi_k$ are assumed unknown.

The residual components $R_I$ and $R_Q$ can be expressed in terms of the I Q aperture response measurements only. Using the defining equations $$S \cos \Phi_x = I_x - R_I$$

$$S \sin \Phi_x = Q_x - R_Q$$

the identity $(S \cos \Phi_x)^2 + (S \sin \Phi_x)^2 = S^2$ becomes $$(I_x - R_I)^2 + (Q_x - R_Q)^2 = S^2$$

Thus, the $R_I$ $R_Q$ residual components can be calculated (16a), along with the signal amplitude S, from the three sets of I Q aperture response measurements that result from the control word settings:

$$(I_1 - R_I)^2 + (Q_1 - R_Q)^2 = S^2$$

$$(I_2 - R_1)^2 + (Q_2 - R_Q)^2 = S^2$$

$$(I_3 - R_I)^2 + (Q_3 - R_Q)^2 = S^2$$

These equations can be solved for the $R_I$ $R_Q$ residual components, yielding $$R_I = \{[(I_1^2 - I_2^2) + (Q_1^2 - Q_2^2)](Q_2 - Q_3) - [(I_2^2 - I_3^2) + (Q_2^2 - Q_3^2)](Q_1 - Q_2)\} / 2\{(I_1 - I_2)(Q_2 - Q_3) - (I_2 - I_3)(Q_1 - Q_2)\}$$

and $$R_Q = \{[(I_1^2 - I_2^2) + (Q_1^2 - Q_2^2)](I_2 - I_3) - [(I_2^2 - I_3^2) + (Q_2^2 - Q_3^2)](I_1 - I_2)\} / 2\{(I_1 - I_2)(Q_2 - Q_3) - (I_2 - I_3)(Q_1 - Q_2)\}.$$

The set X of control words may be selected so that the denominator is not near zero (16b), and hence the computation will be well behaved.

The value of the signal output S may be readily calculated (16c) from any of the equations $$(I_x - R_I)^2 + (Q_x - R_Q)^2 = S^2$$

after the $R_I$ and $R_Q$ residual components have been estimated. Parenthetically, since the signal output amplitude S corresponds to the the actual injected calibration signal S' less losses in the element and amplitude taper in the array, and since S' is known, the losses in the element may be estimated if desired.

3.2. Minimizing Residuals. The effectiveness of the calibration method of the invention in computing calibration coefficients using the $R_I$ and $R_Q$ residual components is enhanced if the magnitude of the residual aperture response vector $R_I/R_Q$ can be minimized (or, at least, reduced to the order of the magnitude $S_J$ of the input phase vector).

To reduce the magnitude of the $R_I$ and $R_Q$ residuals, it is necessary to select values for the control word $\delta_{ij;j\neq J}$ that minimize the terms $$R_I = \Sigma_{j:1,N;j\neq J} S_j \cos \Phi_j$$

and $$R_Q = \Sigma_{j:1,N;j\neq J} S_j \sin \Phi_j$$

where $\Phi_j = \Sigma_{i:1,M}(\delta_{ij}\phi_{ij}) + \Theta_j$.
Since the phase response vectors $\Phi_{j;j\neq J}$, and in particular the associated calibration coefficients $\phi_{ij}$, are assumed unknown, these terms cannot necessarily be set to zero merely by the one time selection of a set of control words $\delta_{ij;j\neq J}$ for the elements of the array other than the selected element J.

Iterative techniques can be used, starting with the nominal (or last calibrated) phase state settings for the nonselected elements of the array. Other techniques can also be used, such as spacing the phase state settings of the control words $\delta_{ij}$ so that the amplitude-weighted sum is near zero.

One iterative technique is to pairwise select sets of $\delta_j$ and $\delta_{j+1}$ so that either $$S_j \cos(\Phi_j - \Theta'_j) + S_{j+1} \cos(\Phi_{j+1} - \Theta'_{j+1})$$

or $$S_j \sin(\Phi_j - \Theta'_j) + S_{j+1} \sin(\Phi_{j+1} - \Theta'_{j+1})$$

are minimized. The control words may be set to alternately minimize the in-phase $R_I$ and quadrature $R_Q$ residuals.

Because of non-uniform weighting and quantization, complete cancellation is generally not possible. If the element is subject to significant amplitude taper ($S_j > S_{j+1}$, and $(S_j)\max >> (S_j)\min$), pairwise cancellation may be relatively ineffective. If the injected signal amplitude can be set so that $S_j \sim S_{j+1}$ for any pair of elements j and j+1, the residuals will be dependent primarily on the errors in computing the associated calibration coefficients.

The goal of reducing the residual components $R_I$ and $R_Q$ is to allow accurate measurement of the effects of changing phase state settings (i.e., phase increment shifts). The residuals must be such that the measurement device being used, typically an analog-to-digital converter, can resolve the phase shift result of the smallest phase shift increment for the phase shifter.

4. Measuring Phase Response. Using the $R_I R_Q$ residual components of the I Q aperture response, the phase responses $\Phi_J$ attributable to a selected element J are measured. These phase response measurements are used to compute the associated calibration coefficients (see, Section 5).

Figure 4:
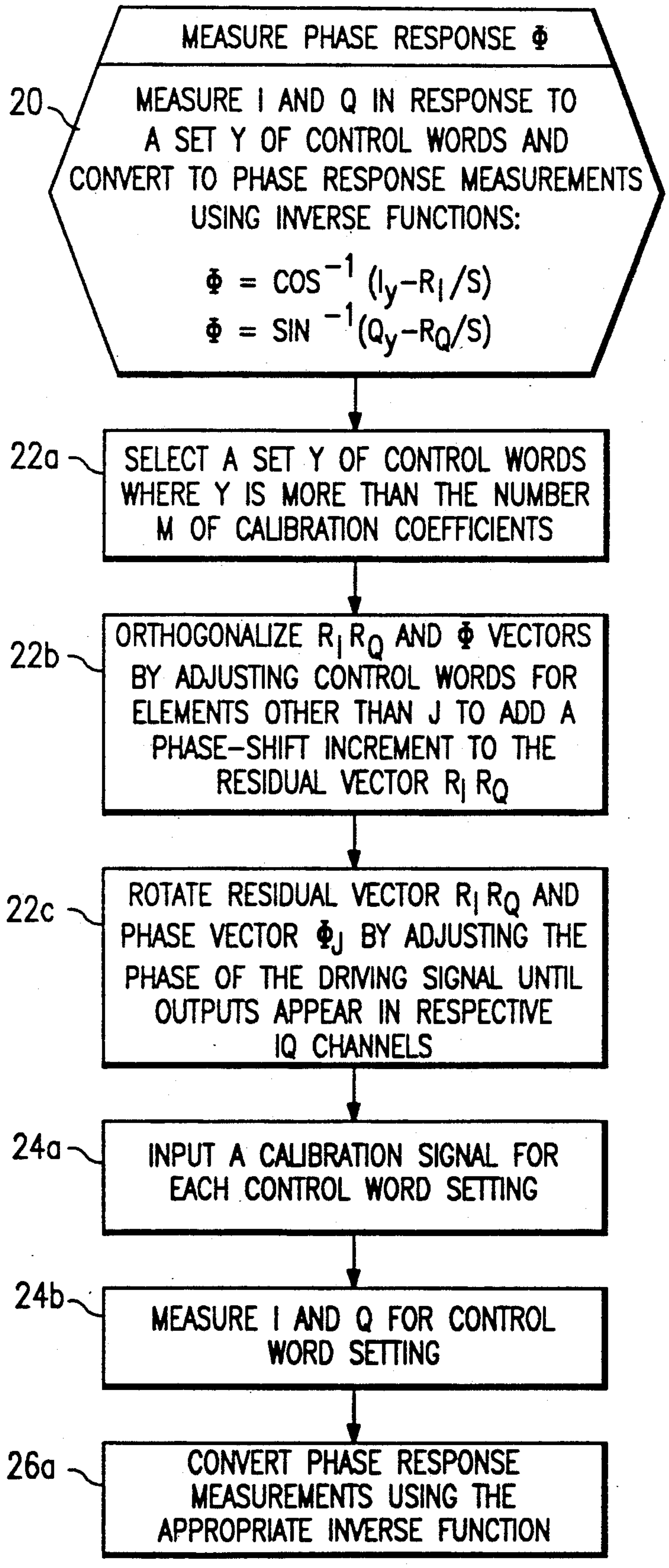
FIG. 4 diagrams a procedure for measuring the phase response for the element J used in computing the calibration coefficients.

FIG. 4 diagrams the recommended procedure for estimating the phase response measurements according to the calibration method of the invention. For each phase shift element, a set Y of control words ($\delta_1, \delta_2, \ldots \delta M$) are selected (22a). Preferably, the number of control words is more than the number of calibration coefficients (M) to allow least squares processing to be used in computing the calibration coefficients (see, Section 5.2).

4.1. Orthogonalization and Rotation. For each control word setting of a selected element, the recommended procedure for measuring the resultant phase response is to attempt to make the residual vector $R_I/R_Q$ orthogonal (22b) to the expected phase response vector $\Phi_J$. This orthogonalization can be accomplished by adjusting the control words for all phase shift elements other than the selected element to add an additional incremental phase shift rotation to the residual vector.

If the $R_I/R_Q$ residual vector can be made orthogonal to the phase vectors ΦJ, the phase of the driving signal can be adjusted in an attempt to identically rotate both vectors into respective I Q channels. That is, a selected incremental phase shift is added to both vectors in an attempt to concentrate the residual component in one channel of the I Q aperture response, making the other channel available for measuring the phase response (and, therefore, computing the calibration coefficients). This vector rotation procedure can be used to provide higher resolution for measuring the phase response of the selected phase shift element.

4.2. Phase Response Measurement. For each control word (phase state) setting, calibration signals are injected (24a), and the resulting aperture responses $I_y$ and $Q_y$ are measured (24b). These aperture response measurements are converted (26) into phase response measurements (using the estimated residual aperture response components).

The aperture response measurements are given by the defining equations:

$$I_y = S \cos \Phi_y + R_I$$

$$Q_y = S \sin \Phi_y + R_Q$$

Thus, for each control word (phase state), the resultant $I_y$ $Q_y$ aperture response measurements can be converted to the desired phase response measurements $\Phi_y$ using the inverse functions:

$$\Phi_y = \cos^{-1}((I_y - R_I)/S)$$

$$\Phi_y = \sin^{-1}((Q_y - R_Q)/S)$$

Each control word results in both $I_y$ and $Q_y$ aperture response measurements, and hence two inverse function values—either of these inverse functions may be used to compute the calibration coefficients $\phi_y$, with the choice depending on the accuracy of the inverse function computation. For example, even if the magnitude of the $R_I$ $R_Q$ residuals cannot be made small (and rotation is not attempted or is not effective), nevertheless, if the residual vector can be made orthogonal to the phase response vector, then the inverse function with the smaller residual component may be selected for computing the calibration coefficients.

5. Computing Calibration Coefficients. For each phase shift element, the phase response measurements resulting from the phase state settings Y are used to compute the associated calibration coefficients according to the phase-state control function:

$$\Phi_y=\Sigma_{i=1,M}\delta_y\phi_i+\Theta$$

The calibration coefficients $\phi_i$ correspond to the incremental phase shifts that result when the phase bits of the phase shift element are set by a particular control word.

Figure 5:
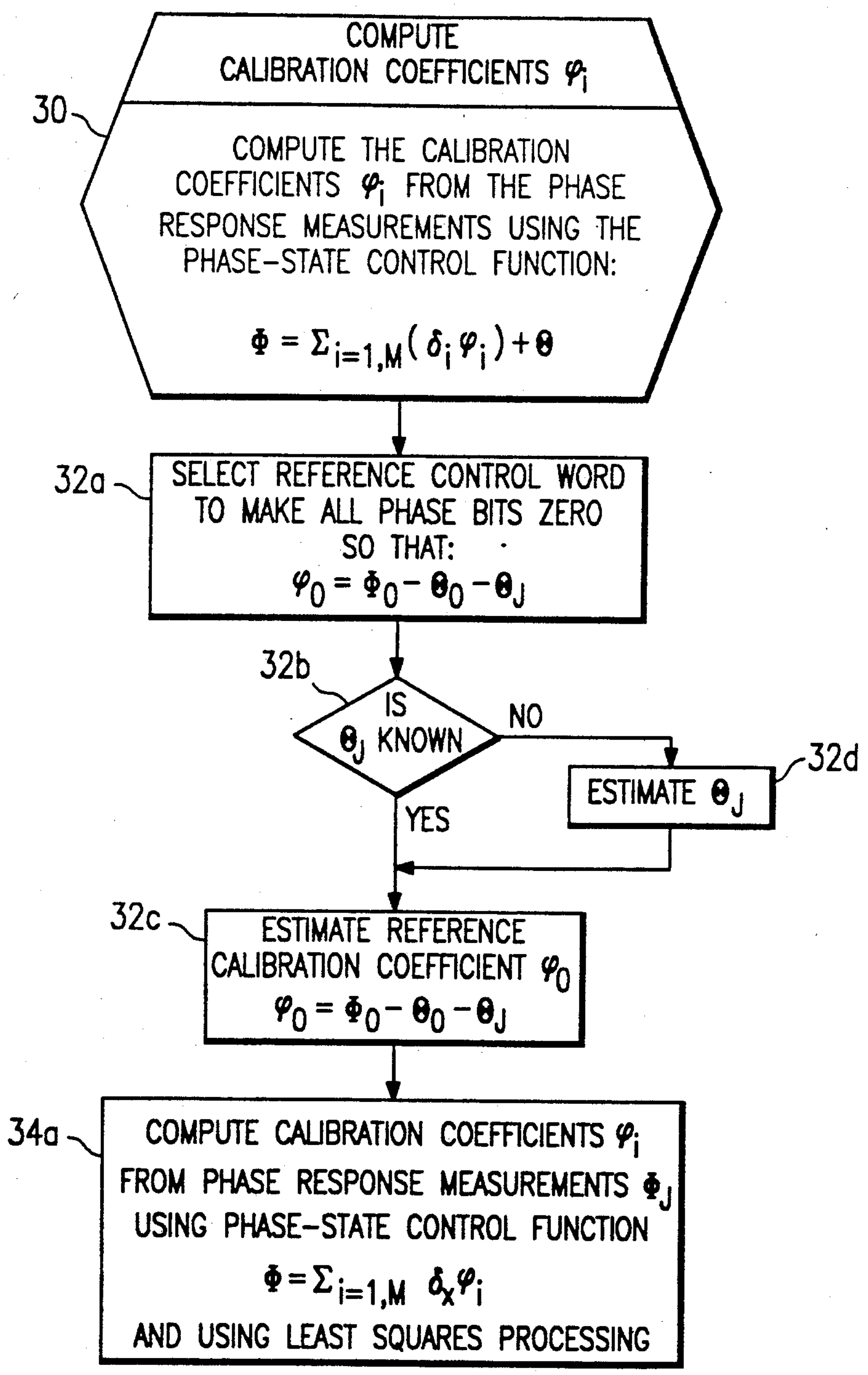
FIG. 5 diagrams a procedure for computing the calibration coefficients using least squares processing.

FIG. 5 diagrams the recommended procedure for computing the calibration coefficients according to the calibration method of the invention. A reference control word is used to estimate a reference phase increment, and obtaining sufficient additional measurements to support least squares processing is recommended.

5.1. Reference Phase Estimation. Since the beam of a phased array antenna is formed and steered by relative phases, the phase-shift calibration coefficients must be computed relative to a reference phase, $\Phi_o$. For a selected phase shift element, if the phase response measurements provided by the inverse functions $\cos^{-1}()$ and $\sin^{-1}()$ are designated $M_y$, then $$M_y=\Sigma_{i:1,M}\delta_y\phi_i+\Theta$$

and one of the set Y of control words corresponds to the phase reference.

If all control bits in the control word are set (32*a*) to zero, then the corresponding reference phase is:

$$M_o=\Phi_o+\Theta$$

or $$\Phi_o=M_o-\Theta$$

where, $\Theta$ is the unknown phase of the input calibration signal $\Theta_o$ at the selected phase shift element, plus a phase deviation for the selected element relative to some reference element. If the phase deviation for a selected phase shift element J is designated as $\Theta'_J$, then the reference phase is given by:

$$\Phi_o=M_o-\Theta_o-\Theta'_J$$

If the phase deviation $\Theta'_J$ is known (32*b*), all phase-shift calibration coefficients $\phi$ can thus be computed (32*c*) within a constant bias $\Theta_o$. This bias is of no consequence because the beam is formed and steered by the relative phases of the elements. If $\Theta_o$ is varied, with a mean value of zero, and the resulting computed calibration coefficients $\phi$ averaged, the bias will be removed.

If the the phase deviations $\Theta'_J$ are unknown (32*d*), additional measurements may be made to estimate them. For example, because $$\Theta'_J=M-\Phi-\Theta$$

then the average generated by making a number of measurements varying both $\Phi$ and $\Theta$ yield $$\Theta'_J=M-\Phi-\Theta.$$

If $\Phi$ and $\Theta$ are varied so that their average, Modulo $2\pi$, is zero, then $\Theta'_J$ will approximate $\Theta'_J$. If the values $\Phi$ and $\Theta$ substracted from the M to estimate $\Theta'_J$ contain both bias and random errors, the estimate of $\Theta'_J$ will contain these biases, but with reduced random errors (by the square root of the number of independent measurements). Since $\Theta$ is a parameter external to the array, the bias in $\Theta$ will be common to all elements and of no significance.

If the functional form for $\Theta'_J$ (as a function of the selected phase shift element J) is known, and the parameters estimated, the difference in biases from element to element are attributable to differences in bias in the $\Phi$ for the different elements. As long as the functional form for $\Theta'_J$ has fewer parameters than the number of phase shift elements (N), those parameters can be estimated.

5.2. Least Squares Estimation. With the reference phase $\Phi_o$ known, the phase-shift calibration coefficients $\phi_y$ may be computed (34*a*) using conventional least squares processing. If more than M phase response measurements are made (recall that $2^M-1$ are available), least squares estimation of the calibration coefficients $\phi$ may be accomplished.

Least squares processing permits noise reduction in the computation of the calibration coefficients, at the computational expense of requiring additional phase response measurements to be made and factored into the computation. Moreover, to reduce quantization effects, the phase of the input signal ($\Theta$) may be varied and additional estimates of the calibration coefficients $\phi$ made and averaged.

Least squares processing for the calibration method of the invention is illustrated by the following example. If all $2^M-1$ phase response measurements are made, the resulting equations can be written in matrix form as $$AX=Y$$

where A is a matrix of the control bits $\delta$, with $2^M-1$ rows and M columns; X is an M vector of the calibration coefficients $\phi$; and Y is a $2M-1$ vector of the phase response measurements (the $M_y$). The minimum mean squared error estimate for the calibration coefficients $\phi$, X', is given by $$X'=(A^TA)^{-1}A^TY.$$

Independent of this ordering of the $\delta$-vectors which form the maxtrix A, $(A^TA)$ is given by an M-by-M matrix with the value 2 on the diagonal and 1 elsewhere, multiplied by a scalar, $2^{(M-2)}$. For example, if $M=4$, $$A^TA = 4\begin{matrix} 2 & 1 & 1 & 1 \\ 1 & 2 & 1 & 1 \\ 1 & 1 & 2 & 1 \\ 1 & 1 & 1 & 2 \end{matrix}$$

and if $M = 7$, $$A^TA = 32\begin{matrix} 2 & 1 & 1 & 1 & 1 & 1 & 1 \\ 1 & 2 & 1 & 1 & 1 & 1 & 1 \\ 1 & 1 & 2 & 1 & 1 & 1 & 1 \\ 1 & 1 & 1 & 2 & 1 & 1 & 1 \\ 1 & 1 & 1 & 1 & 2 & 1 & 1 \\ 1 & 1 & 1 & 1 & 1 & 2 & 1 \\ 1 & 1 & 1 & 1 & 1 & 1 & 2 \end{matrix}$$

The inverse of this matrix, $(A^TA)^{-1}$, is an M-by-M maxtrix with the value M on the diagonal and −1 elsewhere, multiplied by the scaler $1/[(M+1)(2^{(M-2)})]$. For M=4, $$(A^TA)^{-1} = (1/20)\begin{matrix} 4 & -1 & -1 & -1 \\ -1 & 4 & -1 & -1 \\ -1 & -1 & 4 & -1 \\ -1 & -1 & -1 & 4 \end{matrix}$$

The measurements and associated defining equations can be put in any order. If the control bits δ are ordered so that the value K is associated with the ordering such that $$K_k = \Sigma_{i:1,M} 2^{(i-1)} \delta_{ik}$$

then the "natural" ordering of $K_k = 1, 2, \ldots, 2^{(M-1)}$ yields a matrix $(A^TA)^{-1}$ AT which can be precomputed.

For example, for M=4, $$(A^TA)^{-1}A^T = (1/20)\begin{matrix} -1 & -1 & -2 & -1 & -2 & -2 & -3 & 4 & 3 & 3 & 2 & 3 & 2 & 2 & 1 \\ -1 & -1 & -2 & 4 & 3 & 3 & 2 & -1 & -2 & -2 & -3 & 3 & 2 & 2 & 1 \\ -1 & 4 & 3 & -1 & -2 & 3 & 2 & -1 & -2 & 3 & 2 & -2 & -3 & 2 & 1 \\ 4 & -1 & 3 & -1 & 3 & -2 & 2 & -1 & 3 & -2 & 2 & -2 & 2 & -3 & 1 \end{matrix}$$

The estimates of the calibration coefficient φ are the product of this matrix and the vector of measurements.

Note that this sequence of measurements rotates the phase vector $\Phi_J$ over its full range, providing the maximum (and minimum) ratios of both the in-phase and quadrature components to the residuals $R_I$ and $R_Q$.

5.3 Array Amplitude Weighting. The calibration method of the invention may be adjusted to account for, and take advantage of, the array amplitude weighting characteristics typically employed by phased array antenna systems.

The calibration coefficients for the phase shift with lower amplitude wieghting should be computed after computing the coefficients for those elements with higher weighting values, using the improved accuracy of the resulting calibration coefficients for the higher valued variables. More precise control of the residual components $R_I$ and $R_Q$ may thus be obtained.

If the injected signal amplitude $S_J$ is adjusted to compensate for the array amplitude weighting, all $S_J$ can be made equal. The process of minimizing the $R_I R_Q$ residuals is thus made easier.

6. Radiated Signal Input. As indicated in Section 1, the preferred procedure for inputting calibration signals is to inject signals S' of known amplitude. Using signal injection enables the calibration method of the invention to be implemented in real time while the phased array is on-line, accomplishing recalibration of the array dynamically, albeit at the expense of requiring inclusion in the array of a signal injection structure.

As an alternative to dynamically updating the phase-shift calibration coefficients while the array is on-line, the calibration method of the invention may be implemented while the array is off-line by introducing a radiated signal of known amplitude that is detected by the array and used to derive the input calibration signals S. This radiated signal alternative still takes advantage of the automated signal processing technique of the invention in computing updated calibration coefficients in accordance with the array modeling approach described in Section 1. For example, if the form of the phase distribution of the radiated signal, F(J), is a polynomial, least squares estimates of the coefficients is also straightforward. If F(J) is linear in J, that is $$F(J) = a_o + a_1 J,$$

then least squares estimates for $a_o$ and $a_1$ are (using all N elements to generate a set of estimates $\Theta'_j$, j=1,N)

$$a_o' = [\Sigma_j\{\Sigma_i i^2 - j\Sigma_i i^1\}\Theta'_j]/D$$

$$a_1' = [\Sigma_j\{-\Sigma_i i^2 + j\Sigma_i i^0\}\Theta'_j]/D$$

where all sums are from 1 to N, and $$D = (\Sigma_i i^0)(\Sigma_i i^2) - (\Sigma_i i^1)^2$$

If F(J) is a quadratic, i.e.:

$$F(J) = a_o + a_1 J + a_2 J^2$$

then $$a_{0'} = [\Sigma_j\{((\Sigma_i i^2)(\Sigma_i i^4) - (\Sigma i^3)^2) - j((\Sigma_i i^1)(\Sigma_i i^4) - (\Sigma_i i^2)(\Sigma_i i^3)) + j^2((\Sigma_i i^1)(\Sigma_i i^3) - (\Sigma_i i^2)^2)\}\theta'j]/D$$

$$a_{1'} = [\Sigma_j\{-((\Sigma_i i^1)(\Sigma_i i^4) - (\Sigma_i i^3) - (\Sigma_i i^2)) + j((\Sigma_i i^0)(\Sigma_i i^4) - (\Sigma_i i^2)^2) - j^2((\Sigma_i i^0)(\Sigma_i i^3) - (\Sigma_i i^1)(\Sigma_i i^2))\}\theta'j]/D$$

$$a_{2'} = [\Sigma_j\{((\Sigma_i i^1)(\Sigma_i i^3) - (\Sigma_i^2)^2) - j((\Sigma_i i^0)(\Sigma_i i^3) - (\Sigma_i i^1)(\Sigma_i i^2)) + j^2((\Sigma_i i^0)(\Sigma_i i^2) - (\Sigma_i i^1)^2)\}\theta'j]/D$$

where $$D = (\Sigma_i i^o)(\Sigma_i i^2)(\Sigma_i i^4) + 2(\Sigma_i i)(\Sigma_i i^2)(\Sigma_i^3) - (\Sigma_i i^0)(\Sigma_i i^3)^2 - (\Sigma_i i)^2(\Sigma_i i^4) - (\Sigma_i i^2)^3$$

The various sums over i are well known, viz:

$$\Sigma_{i:1,N} i^0 = N$$

$$\Sigma_{i:1,N} i^1 = (N(N+1))/2$$

$$\Sigma_{i:1,N} i^2 = (N(N+1)(2N+1)/2)3$$

$$\Sigma_{i:1,N} i^3 = (N^2(N+1)^2)/4$$

$$\Sigma_{i:1,N} i^4 = (N(N+1)(2N+1)(3N^2+3N-1)/6)/5$$

The extensions to higher order polynomials are routine. The extention to irregular spacing or two dimensional arrays of elements (or a combination of both) is cumbersome, but can be accomplished.

7. Conclusion. The phased array calibration method of the invention uses automated signal processing techniques to compute calibration coefficients using a generalized phase-state control function. The method can be performed in real time while the array is on-line.

The calibration method uses the in-phase I and quadrature Q signals available from the antenna system in response to input (injected or radiated) calibration signals. For each phase shift element of the array, the calibration method estimates the residual component of the aperture response attributable to the elements other than the selected element, and then using those residual components, measures the phase response of the selected element. The calibration coefficients are computed from the phase response measurements using the phase-state control function, preferably using least squares processing. To improve resolution of the phase response measurements (and, thereby, the calibration coefficients), orthogolization and rotation techniques can be used to concentrate the phase response vector in a selected channel of the I Q network.

Although the invention has been described with reference to specific embodiments, this description is not to be construed in a limiting sense. Various modifications of the disclosed embodiments, as well as alternative embodiments of the invention, will become apparent to persons skilled in the art upon reference to the description. It is, therefore, contemplated that the appended claims will cover such modifications that fall within the true scope of the invention.

What is claimed is:

1. A method of calibrating a phased array antenna with N phase shift elements, each having a predetermined number of calibration coefficients and a phase response characterized by a phase-state control function $\Phi_J=f(\phi_{i=1,M},c)$, comprising the steps:

inputting calibration signals to the antenna, causing an aperture response;

for a selected phase shift element, estimating the residual aperture response attributable to the other elements;

measuring the phase response of the selected element using said residual aperture response;

computing calibration coefficients for the selected element from said phase response measurements using the phase state control function; and correcting phase response errors during phase steering operations using said calibration coefficients.

2. The calibration method of claim 1, wherein the aperture response comprises in-phase I and quadrature Q.

3. The calibration method of claim 2, wherein the step of estimating residual aperture response comprises the steps:

selecting a set X of phase state settings of the selected element;

for each phase state setting, measuring the I and Q aperture responses to input calibration signals;

calculating $R_I$ and $R_Q$ residual aperture response components from the I Q aperture responses using the identity $$(I_x-R_I)^2+(Q_x-R_Q)^2=S^2.$$

4. The calibration method of claim 3, further comprising the step:

selecting phase state settings for the non-selected elements such that the magnitude of said $R_I$ $R_Q$ residual components are on the order of the magnitude of the input calibration signal or less.

5. The calibration method of claim 4, wherein the phase state settings are selected such that said $R_I$ $R_Q$ residual components are near zero.

6. The calibration method of claim 4, wherein three phase state settings are selected.

7. The calibration method of claim 4, wherein each phase shift element comprises a predetermined number of phase bits, and each phase state setting is determined by a control word with a corresponding number of control bits.

8. The calibration method of claim 2, further comprising the step of estimating the signal output amplitude S for the selected element, and wherein the step of measuring the phase response of the selected element comprises the steps;

selecting a set Y of phase state settings of the selected element;

for each phase state setting, measuring the I and Q aperture responses for input calibration signals;

measuring phase responses $\Phi_J$ from the I Q aperture responses using said $R_I$ $R_Q$ residual components and the signal amplitude S, and using at least one of the inverse functions $$\Phi_J=\cos^{-1}((I_y-R_I)/S)$$

$$\Phi_J=\sin^{-1}((Q_y-R_Q)/S)$$

9. The calibration method of claim 8, further comprising the step of orthogonalizing the residual vector $R_I/R_Q$ and the phase response vector such that the two vectors are substantially orthogonal.

10. The calibration method of claim 9, wherein the step of computing the calibration coefficients is accomplished by using the inverse function with the smaller residual component.

11. The calibration method of claim 9, wherein the step of orthogonalizing is accomplished by selecting phase state settings for the non-selected elements such that a selected phase increment is added to the residual vector $R_I/R_Q$ to rotate it to be substantially orthogonal to the phase response vector.

12. The calibration method of claim 9, further comprising the step of rotating the residual vector $R_I/R_Q$ and the phase response vector such that the vector outputs appear primarily in respective I and Q channels.

13. The calibration method of claim 12, wherein the step of rotating is accomplished by adjusting the phase of the input calibration signal.

14. The calibration method of claim 13, wherein each phase shift element comprises a predetermined number of phase bits, and each phase state setting is determined by a control word with a corresponsding number of control bits.

15. The calibration method of claim 1, wherein the step of computing calibration coefficients comprises the steps of:

estimating a reference calibration coefficient corresponding to a reference phase shift increment;

computing the calibration coefficients from said phase response measurements and the reference calibration coefficient using the phase-state control function.

16. The calibration method of claim 15, wherein the number of phase response measurements is greater than the number of calibration coefficients, and the step of computing the calibration coefficients is performed by least squares processing.

17. The calibration method of claim 16, wherin the step of estimating a reference calibration coefficient is accomplished by setting all phase states to zero.

18. A method of calibrating a phased array antenna with N phase shift elements, each having a predetermined number of calibration coefficients and a phase response characterized by a phase-state control function $\Phi_J = f(\phi_{i-1,M}, c)$, comprising the steps:

inputting calibration signals to the antenna, causing I and Q aperture response;

for a selected phase shift element, selecting a set X of control words;

for each control word X, measuring the resultant I and Q aperture responses to an input calibration signal;

estimating $R_I$ and $R_Q$ residual components of the aperture response attributable to the non-selected elements, and the signal output amplitude for the selected element, from the I and Q aperture responses using the identity $(I_x - R_I)^2 + (Q_x - R_Q)^2 = S^2$;

for the selected element, selecting a set Y of control words;

for each control word Y, measuring the resultant I and Q aperture responses to an input calibration signal;

measuring the phase responses $\Phi_J$ from the I and Q aperture responses using the $R_I$ and $R_Q$ residual components and the S signal amplitude, and using at least one of the inverse functions $$\Phi_J = \cos^{-1}((I_y - R_I)/S)$$

$$\Phi_J = \sin^{-1}((Q_y - R_Q)/S)$$

computing calibration coefficients for the selected element from said phase response measurements using the phase state control function; and correcting phase response errors during phase steering operations using said calibration coefficients.

19. The calibration method of claim 18, further comprising the step of orthogonalizing the residual vector $R_I/R_Q$ and the phase response vector such that the two vectors are substantially orthogonal.

20. The calibration method of claim 19, wherein the step of measuring phase responses is accomplished by using the inverse function with the smaller residual component.

21. The calibration method of claim 19, wherein the step of orthogonalizing is accomplished by selecting control words for the non-selected elements such that a selected phase increment is added to the residual vector $R_I/R_Q$ to rotate it to be substantially orthogonal to the phase response vector.

22. The calibration method of claim 19, further comprising the step of rotating the residual vector $R_I/R_Q$ and the phase response vector such that the vector outputs appear primarily in respective I and Q channels.

23. The calibration method of claim 22, wherein the step of rotating is accomplished by adjusting the phase of the input calibration signal.

24. The calibration method of claim 18, wherein the step of computing calibration coefficients comprises the steps of:

estimating a reference calibration coefficient corresponding to a reference phase shift increment;

computing the calibration coefficients from said phase response measurements and said reference calibration coefficient using the phase-state control function.

25. The calibration method of claim 24, wherein the number of phase response measurements is greater than the number of calibration coefficients, and the step of computing the calibration coefficients is performed by least squares processing.

26. The calibration method of claim 25, wherin the step of estimating a reference calibration coefficient is accomplished by setting the control word to zero.

27. A method of calibrating a phased array antenna with N phase shift elements, each having a predetermined number of calibration coefficients and a phase response characterized by a phase-state control function $\Phi_J = f(\phi_{i=1,M}, c)$, comprising the steps:

inputting calibration signals to the antenna, causing I and Q aperture response;

for a selected phase shift element, selecting a set X of control words so as to minimize the $R_I$ and $R_Q$ residual components of the aperture response attributable to the non-selected elements;

for each control word X, measuring the resultant I and Q aperture responses to an input calibration signal;

estimating said $R_I$ and $R_Q$ residual components of the aperture response, and the signal output amplitude for the selected element, from the I and Q aperture responses using the identity $(I_x - R_I)^2 + (Q_x - R_Q)^2 = S^2$;

for the selected element, selecting a set Y of control words;

selecting control words for the non-selected elements such that a selected phase increment is added to the residual vector $R_I/R_Q$ to rotate it to be substantially orthogonal to the phase response vector;

for each control word Y, measuring the resultant I and Q aperture responses to an input calibration signal;

adjusting the phase of the input calibration signals to rotate the residual vector $R_I/R_Q$ and the phase response vector such that the vector outputs appear primarily in respective I and Q channels;

measuring the phase responses $\Phi_J$ from the I and Q aperture responses using the $R_I$ and $R_Q$ residual components and the S signal amplitude, and using at least one of the inverse functions $$\Phi_J = \cos^{-1}((I_y - R_I)/S)$$

$$\Phi_J = \sin^{-1}((Q_y - R_Q)/S)$$

computing calibration coefficients for the selected element from said phase response measurements using the phase state control function; and correcting phase response errors during phase steering operations using said calibration coefficients.

* * * * *